US012562057B2

(12) United States Patent
Esparza Garcia et al.

(10) Patent No.: US 12,562,057 B2
(45) Date of Patent: Feb. 24, 2026

(54) METHOD AND DEVICE FOR GROUPING TRAFFIC LIGHT STRUCTURES OF A TRAFFIC LIGHT SYSTEM

(71) Applicant: Robert Bosch GmbH, Stuttgart (DE)

(72) Inventors: Jose Domingo Esparza Garcia, Stuttgart (DE); Max Neuner, Boeblingen (DE); Patrick Koegel, Ludwigsburg (DE); Peter Golya, Budapest (HU)

(73) Assignee: ROBERT BOSCH GMBH, Stuttgart (DE)

( * ) Notice: Subject to any disclaimer, the term of this patent is extended or adjusted under 35 U.S.C. 154(b) by 107 days.

(21) Appl. No.: 18/448,367

(22) Filed: Aug. 11, 2023

(65) Prior Publication Data

US 2024/0144818 A1 May 2, 2024

(30) Foreign Application Priority Data

Oct. 28, 2022 (DE) ..................... 10 2022 211 444.2

(51) Int. Cl.
*G08G 1/095* (2006.01)
*G06V 20/58* (2022.01)

(52) U.S. Cl.
CPC ........... *G08G 1/095* (2013.01); *G06V 20/584* (2022.01)

(58) Field of Classification Search
None
See application file for complete search history.

(56) References Cited

U.S. PATENT DOCUMENTS

2021/0027076 A1* 1/2021 Hayashi ............... G06V 20/584

* cited by examiner

*Primary Examiner* — John F Mortell
(74) *Attorney, Agent, or Firm* — NORTON ROSE FULBRIGHT US LLP

(57) ABSTRACT

A method for grouping traffic light structures of a traffic light system, wherein each traffic light structure has at least one traffic light that can be activated, and wherein a first traffic light structure controls at least a first direction of travel. The method includes: ascertaining a relation of activated traffic lights to one another; grouping the traffic light structures taking into account the ascertained relation. A device and a corresponding computer program are also described.

11 Claims, 4 Drawing Sheets device for grouping
traffic light structures or
ascertaining signal state

1

6  digital mem.

5

2  video system 3  eval. device 4  driving assistance system

9

10a

11

13a
13b
13c
12a

14

12a-r
14-r

METHOD AND DEVICE FOR GROUPING TRAFFIC LIGHT STRUCTURES OF A TRAFFIC LIGHT SYSTEM

CROSS REFERENCE

The present application claims the benefit under 35 U.S.C. § 119 of German Patent Application No. DE 10 2022 211 444.2 filed on Oct. 28, 2022, which is expressly incorporated herein by reference in its entirety.

FIELD

The present invention relates to a method for grouping traffic light structures of a traffic light system, wherein each traffic light structure has at least one traffic light that can be activated, and wherein a first traffic light structure controls at least a first direction of travel, characterized by the method steps of: ascertaining a relation of activated traffic lights to one another; grouping the traffic light structures taking into account the ascertained relation. Furthermore, the present invention comprises a device configured to carry out the method, and a corresponding computer program.

BACKGROUND INFORMATION

For many driver assistance functions and for partially and highly automated driving, light signals of a light signal system (traffic light system) must be correctly identified. Optical systems (cameras, video systems) with corresponding image processing are used for this purpose.

A correct recognition of a corresponding light signal, for example a light arrow pointing to the left, is often not possible over a larger distance, or is at least prone to errors.

Such a problem can occur if a traffic light system is to be ascertained early on from some distance of the vehicle to the traffic light system. Country-specifically, the problem can also arise when the vehicle is already stopped at the intersection, since in some countries the traffic light system is located on the opposite side of the intersection.

At intersections with a plurality of traffic signals controlling different directions of travel, recognizing the correct signal for one's path of travel is also challenging. An assignment is performed, for example, in such a way that a 3D position of the traffic light structure is ascertained and brought into line with the extrapolated lane or road course. In addition to the disadvantage of the high computer power required, the validity of the ascertainments for larger distances is also low and a correct recognition or assignment of the light signals is correspondingly error-prone.

The correct assignment of light signals is further complicated by the fact that, in traffic light systems, there is often not only one single traffic light structure for each direction of travel. In many cases, original light signals of a traffic light structure are replicated by means of additional traffic light structures (replicas). Accordingly, a plurality of traffic lights can be identified in the video data, which immediately causes assignment difficulties in an automated evaluation of the video data.

SUMMARY

A method and device according to the present invention allow the validity of the correct recognition and the assignment of the traffic light structures to be increased. Since a 3D model can also be dispensed with for this purpose, the method is not only faster, but can also be performed with less computer power, which can result in resource or cost advantages. According to the present invention, this is made possible by features disclosed herein. Example embodiments of the present invention are disclosed herein.

The method according to an example embodiment of the present invention for grouping traffic light structures of a traffic light system, wherein each traffic light structure has at least one traffic light that can be activated, and wherein a first traffic light structure controls at least a first direction of travel, includes the method steps of: ascertaining a relation of activated traffic lights to one another; grouping the traffic light structures taking into account the ascertained relation.

The term relation is in this case understood to be a relationship in which things—in this case in particular activated traffic lights in video data—can be compared or are mutually dependent. In this case, real conditions can be taken into account. Alternatively or additionally, constructed conditions can also be taken into account. For example, the following can be mentioned in this regard: object type, size, location, color, transmitted information. Logical relations can also be taken into account here.

Defined relations between recognized activated traffic lights are further ascertained from the ascertained data. A grouping (also referred to as clustering) of specific traffic lights or the corresponding traffic light structures is carried out based on these data or the ascertained relationships. That is to say, the traffic lights are to be assigned to a relevant group according to defined criteria. Thus, the ascertained activated traffic lights are divided into different groups.

Advantageously, according to an example embodiment of the present invention, a first grouping of objects (traffic light structures) is ascertained or defined as a result, which grouping comprises a complete set of signal generators (traffic lights) of a traffic light system that originally display a light signal. In addition, a second grouping of objects (traffic light structures) can be ascertained or defined, which grouping comprises signal generators (traffic lights) of the same traffic light system, which replicate the original light signals; i.e., they reproduce the same light signal again at a different position (so-called replicas). This is understood to mean that a differentiation is made between original objects and replicating objects (replicas). For this purpose, a set of original traffic light structures is advantageously first ascertained and combined into a first group. The remaining objects can be combined into a second group. Alternatively, there is first a check as to whether the remaining objects are actually replicas of the original objects. If this is the case, they may be combined into a second group. If it is not recognized that they are actually replicas of original objects, the corresponding objects can be discarded (or added to the original objects). The ascertainment and/or checking of replicas can be based on, for example, the same content-coded information (in particular the same color) of the traffic light.

In an advantageous embodiment of the present invention, the method can be used in combination with a method for ascertaining a signal state of a first traffic light structure or for improving it. In this case, the method can be used advantageously for assigning traffic information of a first traffic light structure with respect to a vehicle traveling in a first direction of travel.

In a possible embodiment of the present invention, the method includes at least one of the method steps of: ascertaining light points in video data and identifying activated traffic lights from these light points; and ascertaining traffic signals based on activated traffic lights in video data.

In a preferred embodiment of the present invention, in the method, the relation of the activated traffic lights to one another contains two-dimensional information between the activated traffic lights in video data.

In an alternative further development of the present invention, the method includes at least one of the method steps of: ascertaining information relating to an activated traffic light, in particular ascertaining a pixel size and/or a pixel position and/or content-coded information, in particular a color of an activated traffic light in video data, for ascertaining the relation to another activated traffic light; and ascertaining a relation of the activated traffic lights to one another taking into account a relevant pixel size and/or a pixel position and/or content-coded information, in particular a color of the activated traffic lights in video data.

The color of the activated traffic light, for example, can serve as content-coded information relating to a traffic light. An activated green traffic light in this case describes the information "traffic is released." An activated yellow traffic light encodes the information "wait for the next sign before crossing." An activated red traffic light 13a encodes the command "stop before the intersection." Red and yellow traffic lights activated in parallel describe the information "prepare for onward travel." In addition to the color, a pulsation of the activation can be used, for example, by means of which information can be transmitted.

In a possible embodiment of the present invention, in the method, the grouping of traffic light structures is performed taking into account a ratio of the pixel sizes of the activated traffic lights in video data.

This is understood to mean that the pixel size of a traffic light recognized in the video data is evaluated as information describing the relation of this traffic light to another traffic light. Thus, the size of the traffic lights in the video data is the relation between the traffic lights to be evaluated. In this case, the traffic lights are assigned to a defined grouping if the pixel sizes of the traffic lights are within a defined ratio, in particular if the difference between the pixel sizes of two traffic lights is within a defined threshold.

In a preferred embodiment of the present invention, in the method, the grouping of the traffic light structures is performed taking into account a spatial relationship between the activated traffic lights in video data, in particular taking into account at least one of the following elements: horizontal pixel distance between the activated traffic lights; vertical pixel distance between the activated traffic lights; spatial proximity of the pixel positions between the activated traffic lights.

This is understood to mean that the position of a traffic light in the video data is evaluated as information describing the relation of such traffic light to another traffic light. Thus, the position of a traffic light in the video data is the relation between traffic lights that is to be evaluated. In this case, the traffic lights are assigned to a defined grouping if the pixel positions of the traffic lights are within a defined ratio. Advantageously, traffic lights are assigned to a defined grouping if the traffic lights in the video data have a position relative to one another, the horizontal distance (pixel distance) of which is less than a defined threshold. Alternatively or additionally, it is required that the traffic lights in the video data have a position relative to one another, the vertical distance (pixel distance) of which is less than a defined threshold. The spatial proximity of two traffic lights in the video data can alternatively be taken into account as an additional criterion. In this case—for example, if a plurality of traffic lights fulfill the horizontal and/or vertical distance conditions—only the activated traffic lights that have the smallest spatial distance to one another are clustered together.

In an alternative embodiment of the present invention, in the method, the grouping of the traffic light structures is performed taking into account content-coded information, in particular a color of the activated traffic lights.

This means that, for example, the information represented by the color of an activated traffic light is evaluated as information describing the relation of this traffic light to another traffic light. Thus, the color of the traffic lights is the relation between the traffic lights that is to be evaluated. In this case, the traffic lights are in particular assigned to a defined grouping that represents different coded information.

In an advantageous further development of the present invention, in the method, the grouping is performed in such a way that, within a group, the traffic lights with the same content-coded information are located at substantially the same vertical height in the video data.

This is understood to mean that assignment of traffic lights—which have the same content-coded information—to the same group is performed only if the traffic lights are substantially on a vertical line in the video data. As shown above, the color of the traffic light, for example, can be used as content-coded information. Therefore, two green traffic light structures would only be clustered into one group, for example, if these traffic light structures are substantially located above or below one another.

In an alternative embodiment, in the method, the grouping is performed in such a way that, within a group, a traffic light that releases traffic is not at a vertically higher position in the video data than another associated traffic light of a further traffic light structure that does not release traffic.

A traffic light structure is typically designed in such a way that the green traffic light, which releases the traffic, is positioned below the red traffic light, which does not release the traffic. Taking this into account, it can be understood that an assignment of traffic lights to the same group is only performed if the traffic lights, or the corresponding traffic light structures, are in a certain horizontal relationship to one another. In particular, an assignment to the same group is only performed if the corresponding traffic light structures are located on a horizontal line in the video data.

In an advantageous further development of the present invention, the method includes at least one of the method steps of: ascertaining a traffic light structure outside a first grouping, wherein the traffic light structure controls the same direction of travel as a further traffic light structure within the first grouping; validating the ascertained signal state of the traffic light structure within the first grouping on the basis of information of the corresponding traffic light structure outside the first grouping.

Advantageously, the first grouping of traffic light structures is the group of traffic light structures that comprises a complete set of signal generators of a traffic light system that originally display a light signal. The traffic light structure outside the first grouping, for example, can be a traffic light structure of the second group of traffic light structures, which comprises signal generators of the same traffic light system that replicate the original light signals. In this sense, a check of the ascertained signal state of the original traffic light structure can be performed taking into account the replicating traffic light structures. Advantageously, validation is performed if a low confidence is ascertained upon the ascertainment of the signal state of the original traffic light structure.

In a possible embodiment of the present invention, the method includes at least one of the method steps of: assigning the ascertained traffic lights of a grouping to different directions of travel; and/or assigning a traffic light in the right-hand region of the grouping to a direction of travel corresponding to travel straight ahead; and/or assigning a traffic light in the right-hand region of the grouping to a direction of travel corresponding to a right-hand turning process; and/or assigning a traffic light in the left-hand region of the grouping to a direction of travel corresponding to a left-hand turning process.

This means that, based on the position of a traffic light structure or a traffic light, which was ascertained as a member of the grouping of original traffic light structures, the relevant traffic light structure or traffic light is assigned to a direction of travel. In this case, advantage is taken of the fact that a grouping of original traffic light structures comprises a complete set of signal generators of a traffic light system. If the possible different driving directions are also now known—for example, also due to evaluation of video data, or also due to, for example, available navigation data—an assignment of the signal generators, i.e. the traffic light, or the traffic light structure, to the driving directions according to the relevant sequence can take place in a simple manner.

In practice, it is typically not only the assignment of a traffic light structure to a direction of travel that is of interest; rather, the assignment of the traffic light structure to a specific lane of the vehicle is also of interest. In this case, it should be taken into account that a traffic light structure can partially control one or more defined lanes. Alternatively, a lane can contain a plurality of directions of travel. In a preferred embodiment, the method is characterized by at least one of the method steps of: ascertaining lanes; ascertaining the relations of the lanes to one another; assigning the first traffic light structure to the first lane, taking into account the relations of the ascertained activated traffic lights to one another and taking into account the relations of the lanes to one another; assigning the further traffic light structures to the further lanes.

In an alternative embodiment of the present invention, the method includes at least one of the method steps of: ascertaining a signal state of the first traffic light structure; taking into account a signal state of the first traffic light structure as information for a driving assistance system of the motor vehicle that is traveling in the first direction of travel.

This means that the performed grouping of the traffic light structures, in particular in combination with an ascertained signal state of an assigned traffic light structure, can be used as input for a driving assistance system. In this case, the driver assistance system can communicate corresponding information about the relevant traffic light structure to the driver—and, for example, give the driver a recommendation for action. In automated driving assistance systems, the information can further be used as input for the automated control of the vehicle, so that, for example, a stop at a red light can be initiated.

This method can be implemented, for example, in software or hardware or in a mixed form of software and hardware, for example in a control device.

The approach presented here according to the present invention further provides a device which is designed to carry out, actuate or implement the steps of a variant of a method presented here according to the present invention in corresponding apparatuses. The object of the present invention can also be achieved quickly and efficiently by this design variant of the present invention in the form of a device.

In the present case, a device can be understood to be an electrical device that processes sensor signals and, on the basis of these signals, outputs control and/or data signals. The device can have an interface that can be designed as hardware and/or software. In a hardware embodiment, the interfaces can be part of a so-called system ASIC, which comprises a variety of functions of the device. However, it is also possible for the interfaces to be separate integrated circuits or at least partially consist of discrete components. In the event of a software embodiment being used, the interfaces can be software modules that are present, for example, on a microcontroller in addition to other software modules.

Therefore, the device can be an assistance system for recognizing a traffic light signal for a motor vehicle, an assistance system for automated control of longitudinal guidance, an environment detection device, in particular a camera, a lidar and/or a radar, or a central or decentralized control device, which is configured to control one of the devices mentioned or to execute the method described.

A computer program product or a computer program with program code that can be stored on a machine-readable carrier or storage medium, such as a semiconductor memory, a hard disk memory, or an optical memory, and that is used for carrying out, implementing, and/or actuating the steps of the method according to one of the embodiments of the present invention described above is advantageous as well, in particular when the program product or program is executed on a computer or a device.

It should be noted that the features listed individually in the description may be combined with one another in any technically useful manner and indicate further embodiments of the present invention. Further features and usefulness of the present invention will be apparent from the description of exemplary embodiments with reference to the figures.

DETAILED DESCRIPTION OF EXAMPLE EMBODIMENTS

Figure 1:
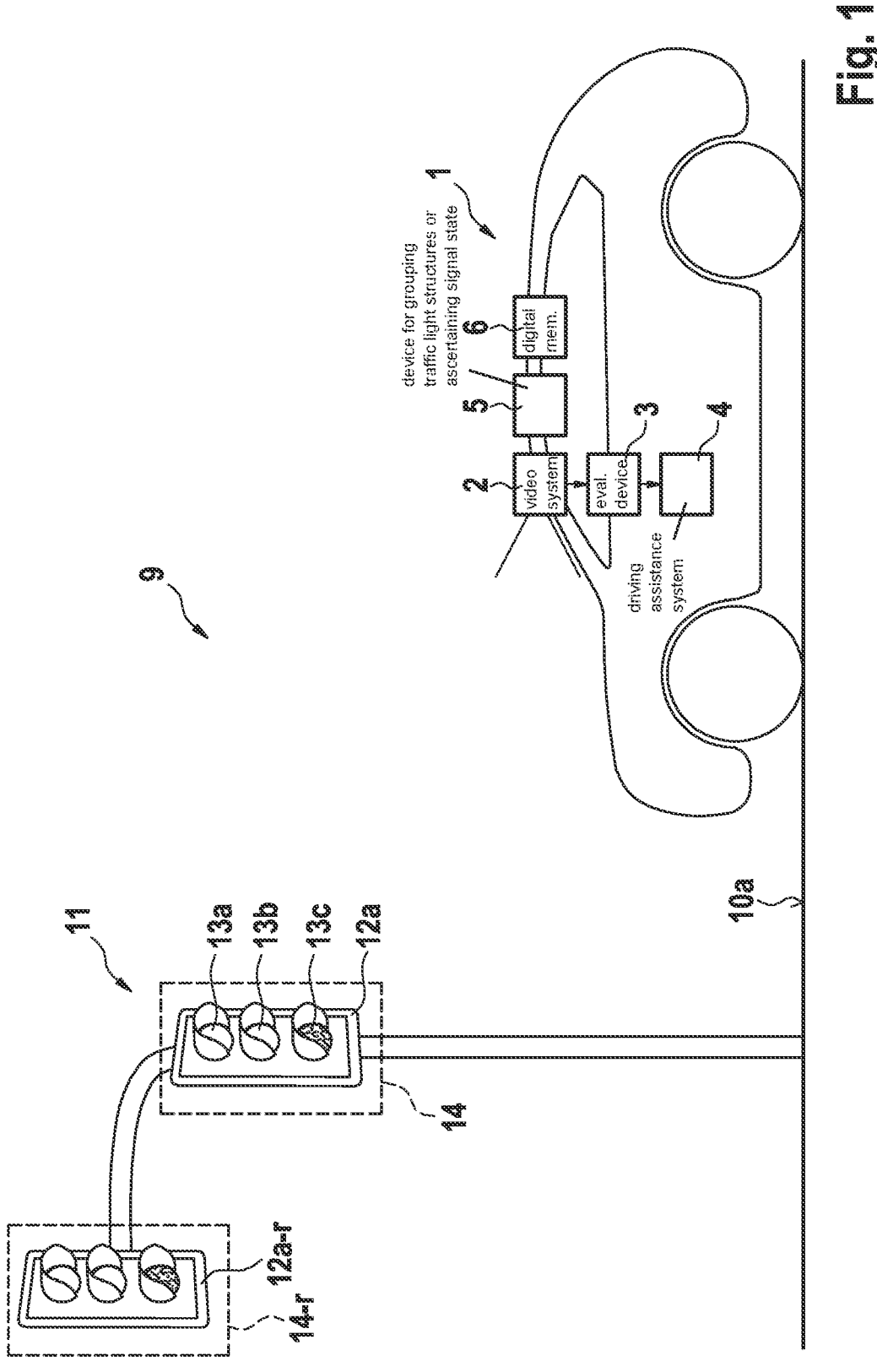
FIG. 1 is a schematic representation of an example embodiment of the present invention in a first environmental situation.

FIG. 1 is a schematic representation of an embodiment of the present invention in a first environmental situation. A motor vehicle 1 in the environment 9 on a lane 10a in a first direction of travel is shown here. The motor vehicle 1 has a video system 2. By means of the video system 2, image data of the environment of the motor vehicle 1 are recorded. These image data are evaluated by an evaluation device 3 by means of evaluation software. In this case, signals are generated and forwarded to the driving assistance system 4. The driving assistance system 4 can, for example, perform automated driving maneuvers, such as automated braking or automated starting. The driver assistance system 4 can also communicate specific information to the driver if required—for example, the current phase status of the next traffic light structure relevant to the driver and/or information or a prompt with regard to braking the vehicle in a timely manner. Furthermore, a device 5 for grouping a plurality of traffic light structures, or for ascertaining a signal state of a traffic light system having a plurality of traffic light structures for a vehicle, can be designed as a stand-alone device. However, this device 5 can also be integrated into the evaluation device 3. Of course, integration directly into the video system 2 or into the driver assistance system 4 is also possible. Furthermore, a digital memory 6 located in the motor vehicle 1 is shown. In the digital memory, for example, information ascertained with regard to an activated traffic light can be stored for a limited period of time to describe the relationship to another activated traffic light.

Furthermore, a traffic light system 11 (also a light signal system) is shown in the environment 9 of the motor vehicle 1. The traffic light system 11 comprises a first traffic light structure (also a signal generator) 12*a* having three traffic lights (also light signal generators) 13*a*, 13*b*, 13*c*. The upper traffic light 13*a* is a red light. The center traffic light 13*b* is a yellow light. The lower traffic light 13*c* is a green light. These traffic lights 13*a*, 13*b*, 13*c* represent a defined signal state of the traffic light structure 12*a* when activated. Usually, four signal states (stop, prepare for onward travel, traffic released, prepare to stop) are defined. The traffic light system 11 further comprises a second traffic light structure 12*a-r*. This is a traffic light structure (replica) that replicates the signals of the original traffic light structure 12*a*. By arranging the second traffic light structure 12*a-r* on an elevated level, concealment is avoided in many situations. Since there are no further traffic light structures, which, for example, control a further direction of travel, the first traffic light structure 12*a* is defined as a singular member of the grouping 14 of the original traffic light structures, and the second traffic light structure 12*a-r* is defined as a singular member of the grouping 14*-r* of the replicating traffic light structures.

Figure 2:
FIG. 2 is a schematic representation of an application of an example embodiment of the present invention in a second environmental situation.

FIG. 2 is a schematic representation of an application of an embodiment of the present invention in a second environmental situation. In contrast to the environmental situation described above, there is now a further traffic light structure 12*b*, which controls its own direction of travel. In this case, the traffic light structure 12*a* controls a lane 10*b* with regard to the direction of travel to the left, while the traffic light structure 12*b* controls the lane 10*a* with regard to the directions of travel straight ahead and to the right. Accordingly, the grouping 14 comprises the original traffic light structures 12*a* and 12*b*. The traffic light system 11 further comprises additional traffic light structures 12*b-r*, which replicate the traffic light signal of traffic light structure 12*b*. Accordingly, the grouping 14*-r* comprises the two replicating traffic light structures 12*a-r* and 12*b-r*.

Figure 3:
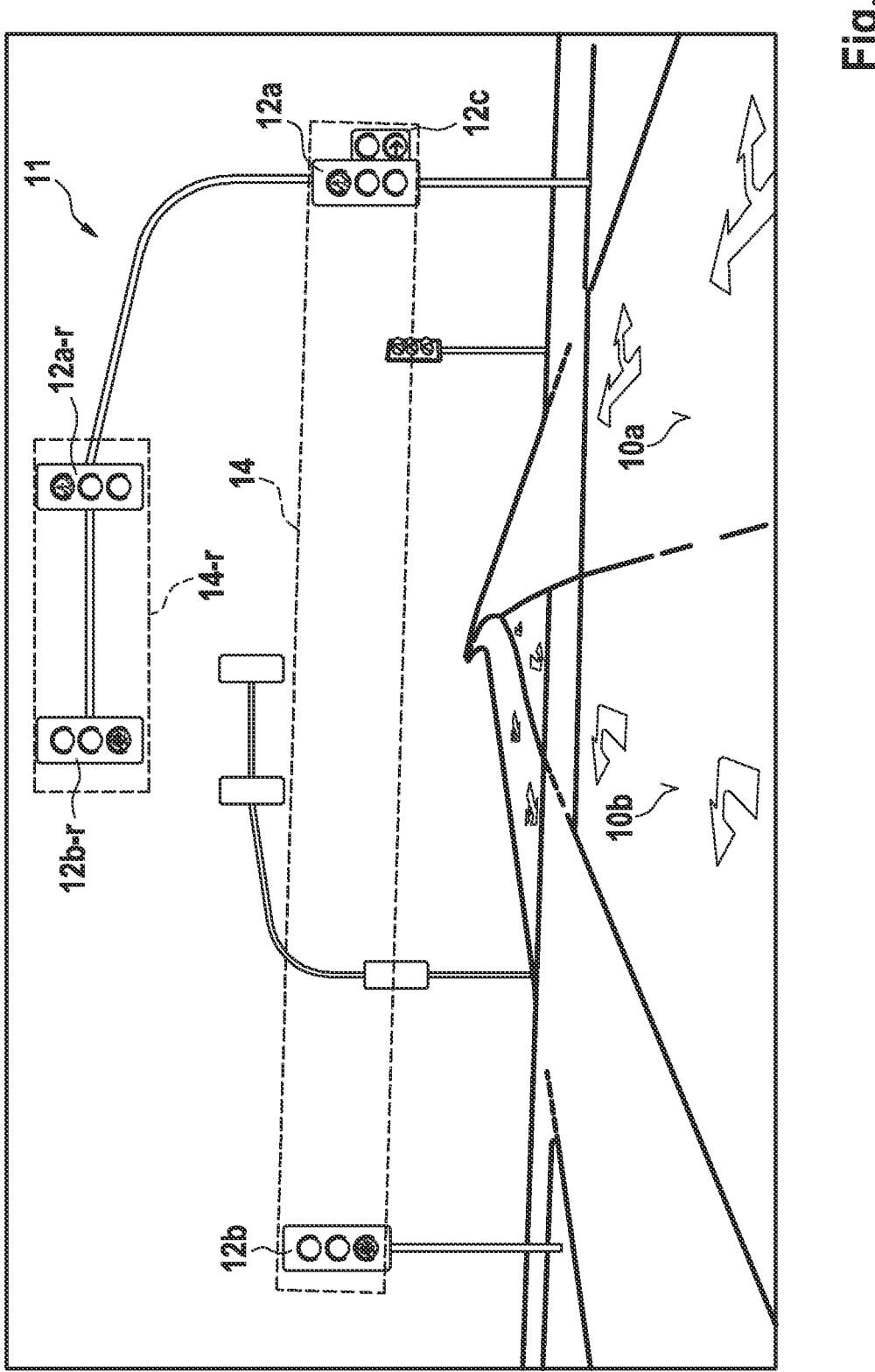
FIG. 3 is a schematic representation of an application of an example embodiment of the present invention in a third environmental situation.

FIG. 3 is a schematic representation of an application of an embodiment of the present invention in a third environmental situation. In contrast to the environmental situation described above, there is now a further traffic light structure 12*c* that controls its own direction of travel. In this case, the traffic light structure 12*c* controls a lane 10*a* with regard to the direction of travel to the right, while the traffic light structure 12*a* controls the lane 10*a* with regard to direction of travel straight ahead and to the right, and the traffic light structure 12*b* controls a lane 10*b* with regard to the direction of travel to the left. Accordingly, the grouping

14 comprises the original traffic light structures 12*a*, 12*b* and 12*c*. In addition, the traffic light system 11 does not comprise a further traffic light structure that replicates the signals from the traffic light structure 12*c*. Accordingly, the grouping 14*-r* comprises the two replicating traffic light structures 12*a-r* and 12*b-r*.

Figure 4:
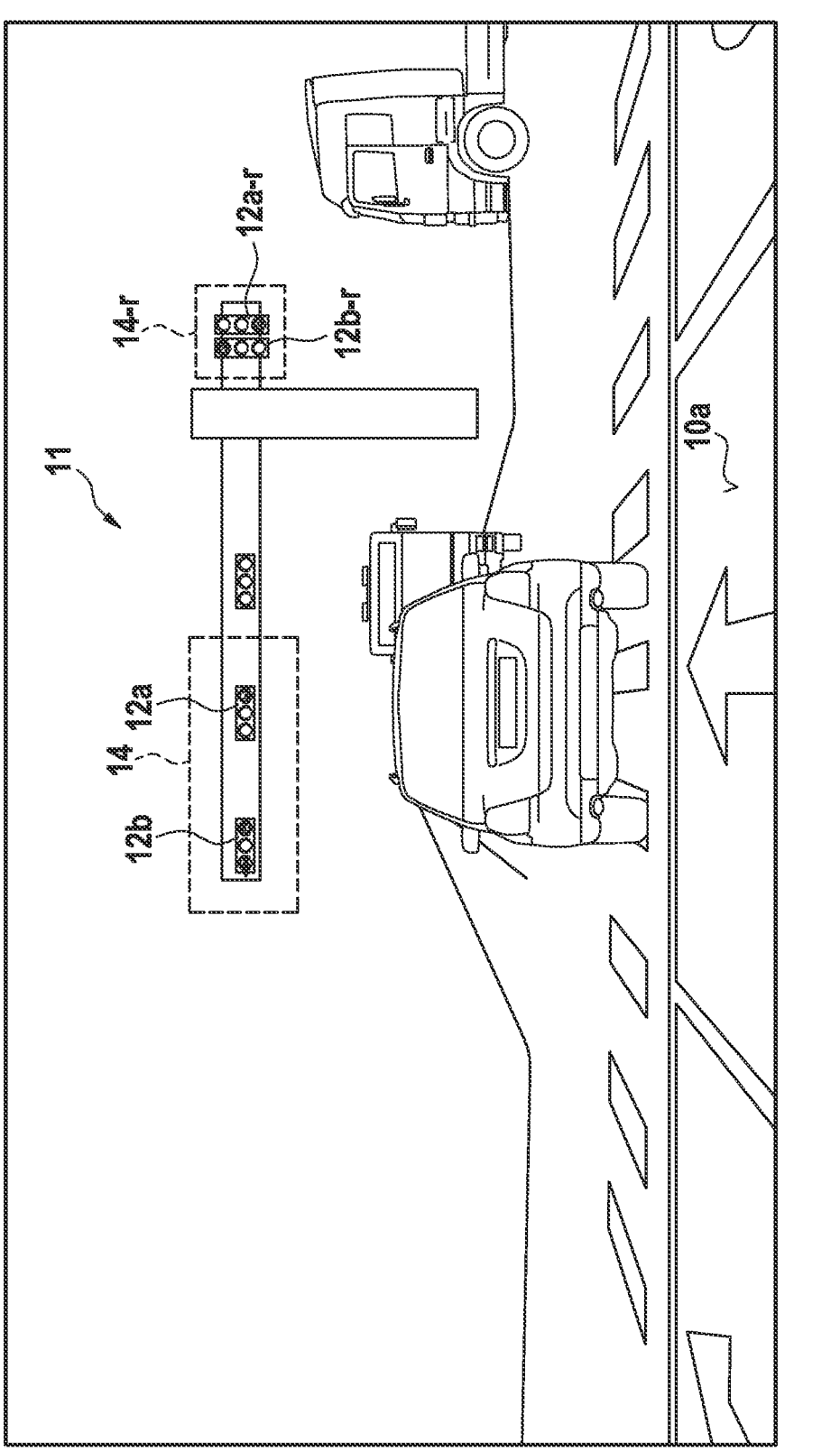
FIG. 4 is a schematic representation of an application of an example embodiment of the present invention in a fourth environmental situation.

FIG. 4 is a schematic representation of an application of an embodiment of the present invention in a fourth environmental situation. In contrast to the environmental situation described above, the traffic light system 11 is positioned on the opposite side of a traffic intersection, as is the case in China, for example. It can also be seen here that the replicating traffic light structures 12*a-r* and 12*b-r* are arranged in a grouping 14*-r* in a side arm of the traffic light system 11, which is located to the right outside the actual roadway. This prevents concealment in many situations, but such traffic light structures do not have a direct spatial relationship to a lane and therefore cannot be taken into account in previous approaches. However, by using the described method, these traffic light structures may be evaluated in the analysis of the video data and the validity of the results can be improved.

What is claimed is:

1. A method for grouping traffic light structures of a traffic light system, wherein each traffic light structure includes at least one traffic light that can be activated, and wherein a first traffic light structure controls at least a first direction of travel, the method comprising the following steps:

ascertaining a relation of activated traffic lights to one another;

grouping the traffic light structures taking into account the ascertained relation of the activated traffic lights, wherein the grouping of the traffic light structures is performed taking into account a ratio of pixel sizes of the activated traffic lights in video data.

2. The method according to claim 1, wherein the relation of the activated traffic lights to one another contains two-dimensional information between the activated traffic lights in video data.

3. The method according to claim 1, further comprising at least one of the following steps:

ascertaining information relating to an activated traffic light including ascertaining a pixel size and/or a pixel position and/or content-coded information including a color of the activated traffic light, in video data, for ascertaining a relation to another activated traffic light;

ascertaining a relation of the activated traffic lights to one another taking into account a relevant pixel size and/or a pixel position and/or content-coded information including a color of the activated traffic lights, in video data.

4. The method according to claim 1, wherein the grouping of the traffic light structures is performed taking into account a spatial relationship between the activated traffic lights in video data, taking into account at least one of the following elements:

horizontal pixel distance between the activated traffic lights;

vertical pixel distance between the activated traffic lights;

spatial proximity of pixel positions between the activated traffic lights.

5. The method according to claim 1, wherein the grouping of the traffic light structures is performed taking into account content-coded information including a color of the activated traffic lights.

6. A method for grouping traffic light structures of a traffic light system, wherein each traffic light structure includes at least one traffic light that can be activated, and wherein a first traffic light structure controls at least a first direction of travel, the method comprising the following steps:

ascertaining a relation of activated traffic lights to one another;

grouping the traffic light structures taking into account the ascertained relation of the activated traffic lights, wherein the grouping is performed in such a way that, within a group, traffic lights with the same content-coded information are located at substantially a same vertical height in video data.

7. A method for grouping traffic light structures of a traffic light system, wherein each traffic light structure includes at least one traffic light that can be activated, and wherein a first traffic light structure controls at least a first direction of travel, the method comprising the following steps:

ascertaining a relation of activated traffic lights to one another;

grouping the traffic light structures taking into account the ascertained relation of the activated traffic lights, wherein the grouping is performed in such a way that, within a group, a traffic light that releases traffic is not located at a vertically higher position in video data than another associated traffic light of a further traffic light structure that does not release the traffic.

8. The method according to claim 1, further characterized by at least one of the following steps:

ascertaining a traffic light structure outside of a first grouping, wherein the traffic light structure controls the same direction of travel as a further traffic light structure within the first grouping;

validating an ascertained signal state of the traffic light structure within the first grouping based on information of the corresponding traffic light structure outside the first grouping.

9. The method according to claim 1, further comprising at least one of the following steps:

assigning the traffic light structures of a grouping to different directions of travel and/or assigning a traffic light structure in a right-hand region of the grouping to a direction of travel corresponding to travel straight ahead and/or assigning a traffic light structure in the right-hand region of the grouping to a direction of travel corresponding to a right-hand turning process and/or assigning a traffic light structure in the left-hand region of the grouping to a direction of travel corresponding to a left-hand turning process.

10. A device configured to group traffic light structures of a traffic light system, wherein each traffic light structure includes at least one traffic light that can be activated, and wherein a first traffic light structure controls at least a first direction of travel, the device configured to:

ascertain a relation of activated traffic lights to one another;

group the traffic light structures taking into account the ascertained relation of the activated traffic lights, wherein the grouping of the traffic light structures is performed taking into account a ratio of pixel sizes of the activated traffic lights in video data.

11. A non-transitory computer-readable medium on which is stored a computer program for grouping traffic light structures of a traffic light system, wherein each traffic light structure includes at least one traffic light that can be activated, and wherein a first traffic light structure controls at least a first direction of travel, the computer program, when executed by a computer, causing the computer to perform the following steps:

ascertaining a relation of activated traffic lights to one another; and grouping the traffic light structures taking into account the ascertained relation of the activated traffic lights, wherein the grouping of the traffic light structures is performed taking into account a ratio of pixel sizes of the activated traffic lights in video data.

* * * * *